US006991246B1

(12) United States Patent
McCalip

(10) Patent No.: US 6,991,246 B1
(45) Date of Patent: Jan. 31, 2006

(54) TRAILER HITCH ASSEMBLY

(76) Inventor: Vincent C. McCalip, 317 E. Madison Ave., Grand Junction, TN (US) 38039

( * ) Notice: Subject to any disclaimer, the term of this patent is extended or adjusted under 35 U.S.C. 154(b) by 0 days.

(21) Appl. No.: 10/854,834

(22) Filed: May 27, 2004

(51) Int. Cl.
*B62D 1/00* (2006.01)

(52) U.S. Cl. .................................... 280/474; 280/460.1

(58) Field of Classification Search ................ 280/474, 280/456.1, 460.1, 502, 501
See application file for complete search history.

(56) References Cited

U.S. PATENT DOCUMENTS

| | | | | |
|---|---|---|---|---|
| 3,033,593 A | | 5/1962 | Zaha | |
| 3,379,452 A | | 4/1968 | Torrisi | |
| 3,815,939 A | * | 6/1974 | Pettay | 280/474 |
| 4,076,264 A | | 2/1978 | Chatterley | |
| 4,305,602 A | | 12/1981 | Ungvari et al. | |
| 4,426,097 A | * | 1/1984 | Livingston | 280/416.1 |
| 4,452,465 A | | 6/1984 | Bourke | |
| 4,509,769 A | * | 4/1985 | Weber | 280/491.1 |
| 4,512,593 A | | 4/1985 | Ehrhardt | |
| 4,664,403 A | * | 5/1987 | Livingston | 280/460.1 |
| 6,357,778 B1 | * | 3/2002 | Ross | 280/456.1 |
| 6,626,449 B2 | * | 9/2003 | Hazen | 280/492 |

* cited by examiner

*Primary Examiner*—Tony Winner
(74) *Attorney, Agent, or Firm*—R. Neil Sudol; Henry D. Coleman; William J. Sapone

(57) ABSTRACT

A trailer hitch assembly is used with a trailer having a plurality of wheels each rotatable about a horizontal axis and a vertical axis. The hitch assembly includes coupling elements on the trailer for fixedly engaging the trailer to a towing vehicle in a horizontal plane parallel to the ground surface during a rearward motion of the vehicle and the trailer and for pivotably linking the trailer to the vehicle in the horizontal plane during a forward motion of the vehicle and the trailer. A locking mechanism automatically preventing rotation of the wheels about the respective second axes during the forward motion of the trailer and the vehicle and for enabling rotation of the wheels about the respective second axes during the rearward motion of the trailer and the vehicle.

5 Claims, 6 Drawing Sheets

TRAILER HITCH ASSEMBLY

FIELD OF THE INVENTION

This invention relates to an improved trailer hitch arrangement for attachment to a vehicle to facilitate the attaching and towing of a double caster wheel trailer.

BACKGROUND OF THE INVENTION

Most two-wheel trailers involve a conventional pivot-type hitch such that the trailer does not identically track with the towing vehicle, particularly when backing up. Nevertheless there have been attempts to provide a two-wheel trailer which will track with the vehicle similar to a single-wheel trailer. For example, U.S. Pat. No. 2,475,174 (Boone), U.S. Pat. No. 3,033,593 (Zaha), U.S. Pat. No. 3,379,452 (Torrisi), U.S. Pat. No. 4,452,465 (Bourke), U.S. Pat. No. 4,305,602 (Ungvari), U.S. Pat. No. 4,512,593 (Ehrhardt) and U.S. Pat. No. 4,076,264 (Chatterley) all disclose two-wheel trailers employing some special arrangement, such as casters, a control linkage between the two caster wheels, and/or a dual or specialized hitch arrangement for effecting a rigid securement of the trailer to the towing vehicle. These latter patents have hence attempted to provide a structure so as to increase the control, and thus the tracking, of the trailer relative to the towing vehicle. These attempts, however, as evidenced by the complexities of the structures disclosed in these patents, and the fact that these structures still have undesirable characteristics, readily indicate the difficulty in providing a two-wheel trailer together with a hitch attachment therefore which will properly track with the vehicle movement, particularly when backing up.

More specifically, U.S. Pat. No. 2,475,174 to Boone discloses a trailer having a pair of caster-type wheels, with the trailer having a single central hitch for attachment to the towing vehicle. The trailer also has a pair of separate auxiliary connectors disposed on opposite sides of the hitch adjacent the ends of the vehicle bumper, which auxiliary connectors control a flexible cable linkage, which in turn controls the swivelling of the casters. This patent hence discloses a three-point hitch arrangement, and does not permit free swivelling of the casters, but rather provides a complex arrangement for controlling swivelling of the casters.

U.S. Pat. No. 3,033,593 to Zaha as mentioned above, discloses a trailer having a pair of caster-type wheels, a central hitch of conventional configuration, and a pair of sidewardly spaced tie bars so as to create a three-point connection. This hence rigidifies the trailer relative to the vehicle, but the side tie bars must be released when swivelling of the wheels and backing of the trailer is desired. Further, this three-point connection does not permit proper rolling movement of the trailer relative to the vehicle, such as may be necessary to compensate for irregularities in the highway.

U.S. Pat. No. 4,305,602 to Ungvari discloses a trailer having caster-type wheels, with the trailer having a dual hitch arrangement so as to rigidify the trailer relative to the vehicle. This double hitch arrangement, however, has several disadvantages. For example, the tow vehicle must be provided with a specialized tow bar which mounts hitch balls thereon. Further, the overall hitch arrangement does not permit or compensate for rolling movement of the trailer relative to the vehicle due to unevenness in the highway. This hitch arrangement also does not permit even weight distribution on the trailer or vehicle wheels.

U.S. Pat. No. 4,512,593 to Ehrhardt discloses two caster wheels joined together by drive sprockets and chains so that the caster wheels are constrained for simultaneous movement. The trailer also has two rigid tow bars which couple to sidewardly spaced hitch balls mounted on the tow vehicle. This arrangement possesses the same disadvantages mentioned above, and like Ungvari, does not permit relative roll between the vehicle and trailer.

U.S. Pat. No. 4,664,403 to Livingston is directed to a trailer hitch structure for coupling a double caster-type wheel trailer to a towing vehicle having a conventional hitch bar fixed thereto and projecting rearwardly thereof. A rigid vehicle connector has a front portion fixedly connectable to the hitch bar. The front portion connects to a transversely extending rear portion which extends generally parallel to the vehicle bumper. This rear portion mounts adjustable bumper elements adjacent the opposite ends thereof, the bumper elements being adjustable for engagement with the vehicle bumper. A crossbar is positioned adjacent but slightly rearwardly from the rear portion and is coupled thereto through a swivel structure which defines a horizontal roll axis which extends in the longitudinal direction of the vehicle. The crossbar mounts a pair of hitch balls adjacent the opposite ends thereof. The trailer has a tongue structure provided with a pair of sidewardly spaced couplers for releasable engagement with the hitch balls.

OBJECTS OF THE INVENTION

It is an object of the present invention to provide an improved hitch arrangement specifically for cooperation between a towing vehicle and a trailer of the type employing plural caster-type wheels.

Another object of the present invention is to provide such a hitch arrangement provides improved tracking of the trailer in both a forward direction and a rearward direction.

A further object of the present invention is to provide such a hitch arrangement which facilitates coupling and decoupling of a trailer from a towing vehicle.

Yet another object of the present invention is to provide such a hitch arrangement that automatically converts between a forward motion mode of operation and a rearward motion mode of operation.

These and other objects of the present invention will be apparent from the drawings and description herein. Although every object of the invention is believed to be attained by at least one embodiment of the invention, there is not necessarily any single embodiment that achieves all of the objects of the invention.

SUMMARY OF THE INVENTION

A trailer hitch assembly in accordance with the present invention comprises a trailer having a plurality of wheels each rotatable about a first axis oriented parallel to an underlying ground surface and a second axis oriented substantially perpendicularly to such ground surface. The hitch assembly further comprises coupling elements on the trailer for fixedly engaging the trailer to a towing vehicle in a horizontal plane parallel to the ground surface during a rearward motion of the vehicle and the trailer and for pivotably linking the trailer to the vehicle in the horizontal plane during a forward motion of the vehicle and the trailer. Locking components are operatively connected to the coupling elements for preventing rotation of the wheels about the respective second axes during the forward motion of the trailer and the vehicle and for enabling rotation of the wheels about the respective second axes during the rearward motion of the trailer and the vehicle.

In accordance with another feature of the present invention, the coupling elements include a first bar rigidly secured to the trailer in the horizontal plane perpendicularly to a longitudinal axis of the trailer. The coupling elements further include a second bar rigidly securable to the vehicle in the horizontal plane perpendicularly to a longitudinal axis of the vehicle. The first bar and the second bar are positioned to be in contact with one another during the rearward motion of the trailer and the vehicle.

In accordance with another feature of the present invention, the coupling elements also include a third bar slidably connected to the trailer and pivotably connectable to the vehicle. The locking components are operatively linked to the third bar.

In accordance with further features of the present invention, the locking components include a spring loaded latching mechanism operatively connected to the third bar, an elongate tensile member extending from the spring loaded latching mechanism to the third bar, a pair of locking rods extending substantially perpendicularly to the longitudinal axis of the trailer, and a rotatable disk connected to the rods and the tensile member, the disk being spring biased to pivot about a substantially vertical axis oriented perpendicularly to the ground surface.

In accordance with additional features of the present invention, the coupling elements further include links for connecting the second bar to the vehicle at exactly two locations on the vehicle. The links include a U-shaped clamping member extendable around and engageable with a bumper or an axle of the vehicle and further include a screw adjustment for modifying a length of the clamp. The links may further includes a fastener for tying the second bar to a trailer post on the vehicle.

In accordance with more specific features of the present invention, the first bar and the second bar have mutually engageable planar faces, while the third bar is constrained to one degree of freedom of motion relative to the trailer.

Another embodiment of a trailer hitch assembly in accordance with the present invention comprises a trailer having a plurality of castor-type wheels, a front side and a back side and a longitudinal axis oriented perpendicularly to the front side and the back side. A first bar is attached to the trailer at the front side, the bar extending substantially perpendicularly to the axis and substantially parallel to a ground surface. Coupling elements are provided for securing a second bar to a rear side of a towing vehicle at exactly two locations on the towing vehicle. The coupling elements include a fastener for coupling the second bar to a trailer post on the vehicle and further include a clamp connected to the second bar at a position spaced from the fastener for coupling the second bar to a bumper bar of the vehicle. A connector is provided for at least indirectly connecting the first bar to the second bar at exactly one location.

As discussed above, the clamp may include a U-shaped clamping member extendable around and engageable with a bumper bar or an axle of the vehicle and further include a screw adjustment for modifying a length of the clamp. The connector may include a pin.

In another embodiment of the present invention, a trailer hitch assembly comprises a trailer having a plurality of wheels each rotatable about a first axis parallel to an underlying ground surface and about a second axis substantially perpendicular to the ground surface. The hitch assembly further comprises a first horizontal bar mounted to the trailer perpendicularly to a longitudinal axis of the trailer, a second bar, two fasteners for connecting the second bar to a rear side of a vehicle, and a trailer hitch member of variable effective length mounted to the trailer and connectable to the vehicle. The first bar and the second bar are engaged with one another during a rearward motion of the vehicle and the trailer and are spaced from one another during a forward motion of the vehicle and the trailer. The hitch assembly further includes a locking mechanism mounted to the trailer and operatively connected to the trailer hitch member and the wheels to alternately permit and disable rotation of the wheels about the respective second axes in accordance with the instantaneous effective length of the trailer hitch member.

The present invention provides a hitch arrangement that offers improved tracking of the trailer in both a forward direction and a rearward direction. The present hitch arrangement facilitates coupling and decoupling of a trailer from a towing vehicle. Conversion between a forward motion mode of operation and a rearward motion mode of operation is automatic.

DEFINITIONS

The term "longitudinal axis" when applied herein to a vehicle or a trailer means a line extending perpendicular to an axle of the vehicle and parallel to a ground surface.

The term "castor-type wheel" is used herein to denote a wheel that is rotatable about two axes, namely, a horizontal axis extending along a wheel axle and a vertical axis, so that the wheel is responsive to forces acting thereon to roll in any direction along a ground or floor surface.

The word "bar" as used herein refers to an elongate rigid member. The rigid member can have any cross section. However, certain kinds of bars as that term is used herein preferably have a cross-section with at least one flat face. Thus, a bar attached to a front end of a trailer perpendicular to a longitudinal axis of the trailer as described herein has a planar face extending generally perpendicularly to an underlying ground surface, that planar face being engageable with a generally vertical planar surface of another bar attached to a towing vehicle. When these two bars are in this engagement, the trailer becomes rigid with the vehicle and the trailer's wheels pivot about in accordance with the direction of steering of the vehicle.

The term "ground surface" or "ground" is used herein to denote any generally horizontal surface over which a vehicle with a trailer may be impelled. Thus, a ground surface may be a road surface, a field, a lot, a floor surface, a lawn, a garden, etc.

The term "effective length" as used herein describes an elongate member extending between two locations, for example, between a point on a towing vehicle and a point on a trailer, and that moves or deforms to accommodate different distances between the two points. The "effective length" of the elongate member is variable because the distance between the two points is variable. Where an elongate member is a slidable bar, the effective length extends from one of the bar attached, for instance to a towing vehicle, and a bearing point of the slidable bar on the trailer. The bearing point may be an end of a sleeve through which the slidable bar extends. Alternatively, a linking member with a variable effective length may take the form of a telescoping tube, or a helical spring.

DETAILED DESCRIPTION OF THE PREFERRED EMBODIMENTS

Figure 1:
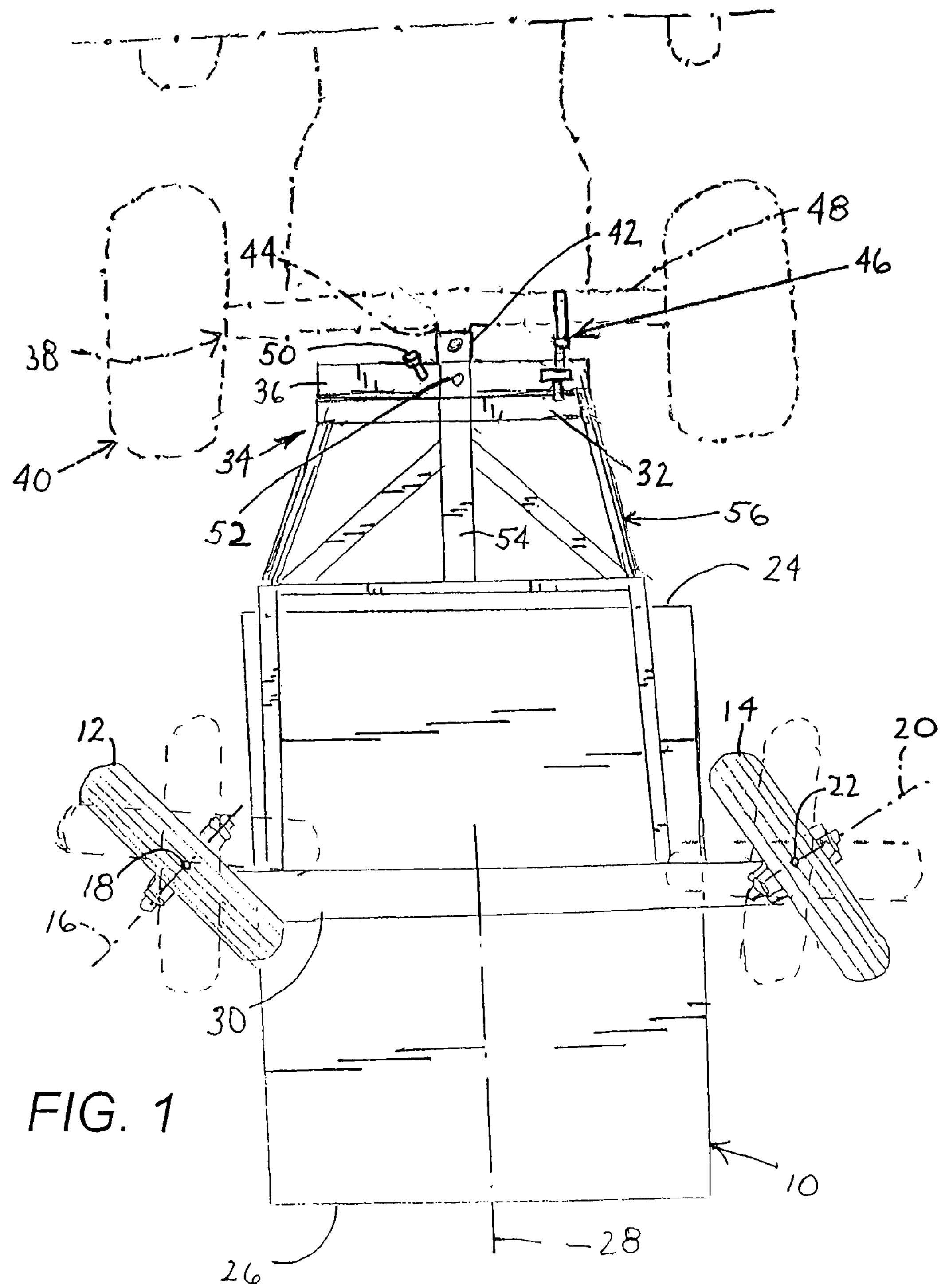
FIG. 1 is a schematic bottom plan view of a trailer hitch assembly in accordance with the present invention.
Figure 2:
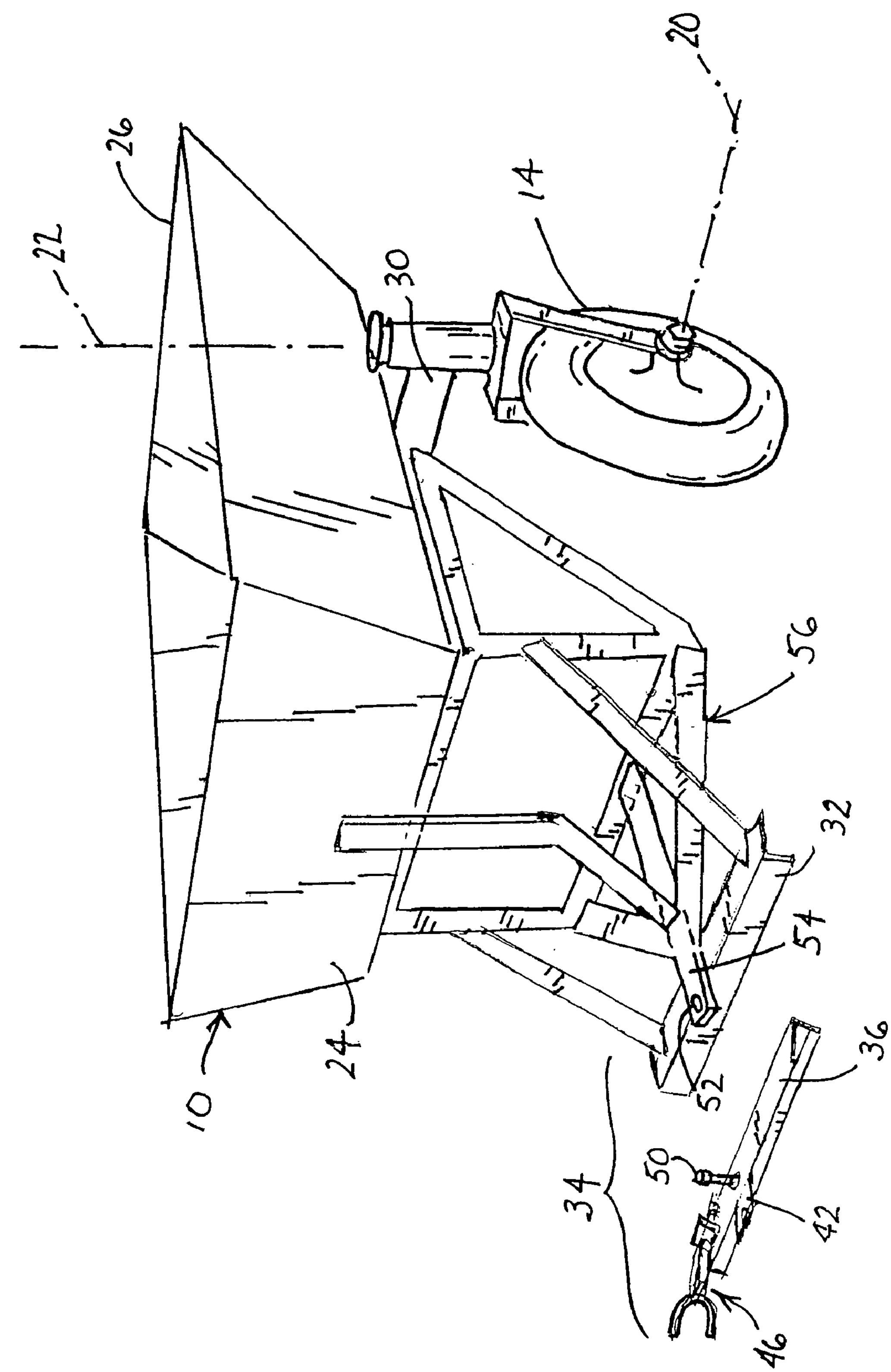
FIG. 2 is a schematic perspective view of the trailer hitch assembly of FIG. 1.
Figure 3:
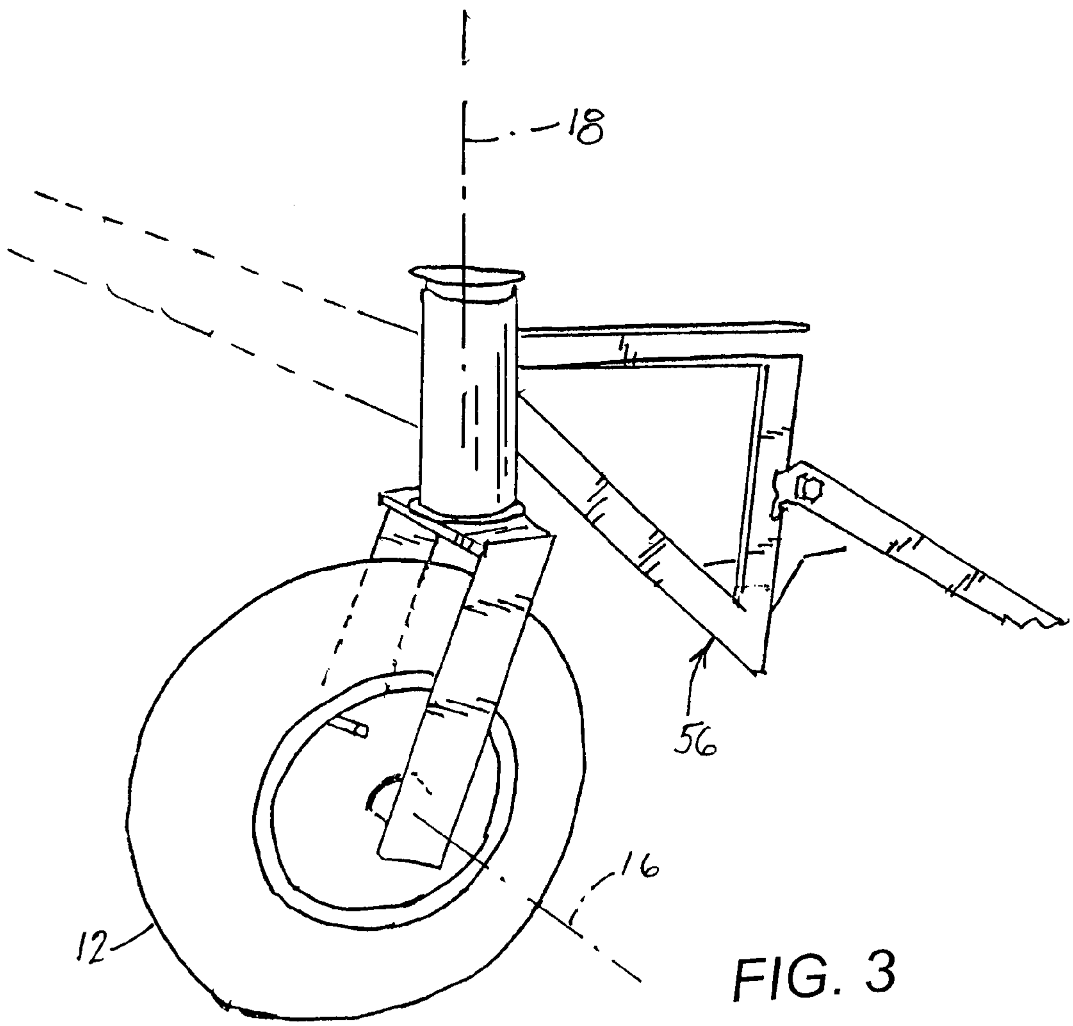
FIG. 3 is a schematic perspective view of a portion of a trailer including a castor-type wheel, shown in FIGS. 1 and 2.

As illustrated in FIGS. 1 and 2, a trailer hitch assembly comprises a trailer 10 having a pair of castor-type wheels 12 and 14. Wheel 12 is rotatable about a horizontal axis 16 oriented parallel to an underlying ground surface and a vertical axis 18 oriented substantially perpendicularly to such ground surface. Similarly, wheel 14 is rotatable about a horizontal axis 20 and a vertical axis 22.

Trailer 10 has a front side 24 and a back side 26 and a longitudinal axis 28 oriented perpendicularly to the front side and the back side, as well as to an axle 30 extending between wheels 12 and 14. A bar 32 in the exemplary form of an angle beam or a channel member is attached to trailer 10 at front side 24. Bar 32 extends substantially perpendicularly to axis 28 and substantially parallel to the ground. A set of coupling elements 34 are provided for securing a second angle or channel bar 36 to a rear side 38 of a towing vehicle 40 (ATV, lawn tractor, etc.) at exactly two locations on the towing vehicle.

Coupling element set 34 includes a fastener 42 such as a perforated tab for receiving a fastener 43 to couple second bar 36 to a trailer post 44 on vehicle 40 and further includes a clamp 46 connected to the second bar at a position spaced from fastener 42 for coupling the second bar to a bumper bar or axle 48 of the vehicle. A connector 50 such as a pin or bolt is provided for connecting bar 32 and thus trailer 10 to bar 36 at exactly one location. Connector pin or bolt 50 extends through a hole 52 in a substantially rigid metal strip 54 forms part of a supporting trusswork 56 for bar 32. Connector pin or bolt 50 also extends through a hole (not separately labeled) in bar 36 that is aligned with hole 52.

Figure 5:
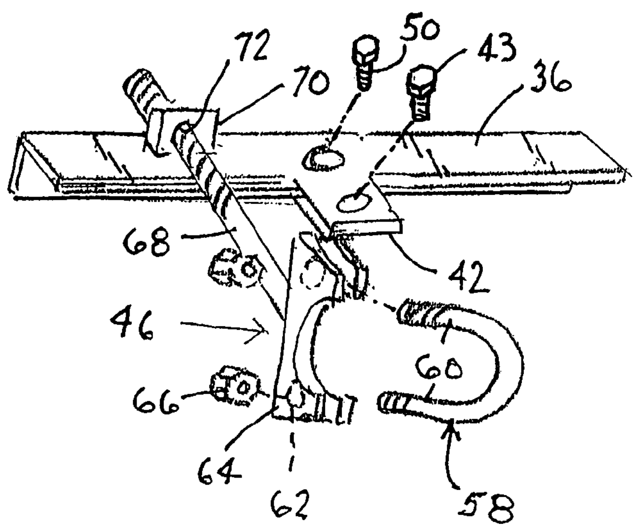
FIG. 5 is a schematic exploded perspective view, on a larger scale, of a clamp included in the trailer hitch assembly of FIGS. 1 and 2.
Figure 4:
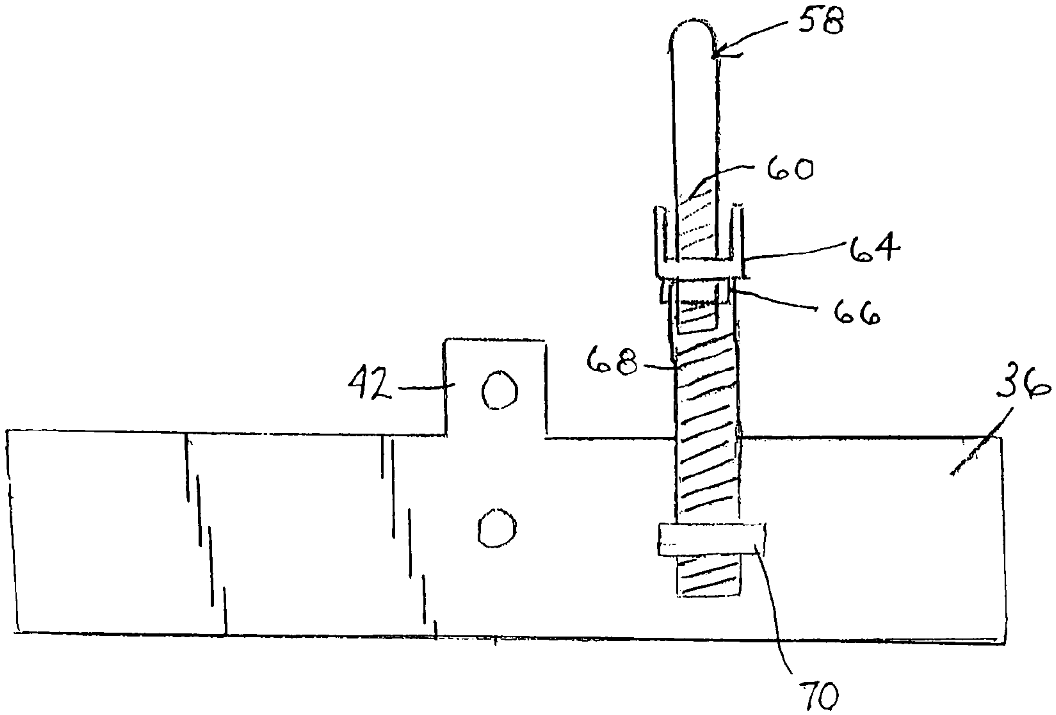
FIG. 4 is a schematic top plan view of the clamp of FIG. 3, showing the clamp in an assembled configuration.

As depicted in FIGS. 4 and 5, clamp 46 includes a U-shaped clamping member 58 with legs 60 that are insertable through respective apertures 62 in a clamping bracket 64. Nuts 66 secure U-shaped clamping member 58 to bracket 64. Bracket 64 is in turn connected to bar 36 via a threaded bolt 68 that screwingly traverses an internally threaded aperture 70 in a tab 72 on bar 36 so as to enable an adjustment or modification of the length of clamp 46 and concomitantly of the distance between bar 36 and bumper or axle 48 of towing vehicle 40. Clamping member 58 is positionable around and in engagement with bumper bar or axle 48 of vehicle 40.

Bar 36 is mounted to vehicle 40 by fastener 42 and clamp 46. Bolt 68 is turned to adjust the effective length of the bolt, i.e., the distance between bar 36 (or, more specifically, tab 72) and bumper or axle 48. This adjustment ensures that bar 36 is oriented perpendicularly to the longitudinal axis of the vehicle 40.

It is contemplated that bar 36 remains fixed to towing vehicle 40 for an extended period, while trailer 10 may be successively coupled to and decoupled from vehicle 40 several times. Connector 50 is preferably of a quick-connect or quick-release type, such as a bolt or pin that is merely inserted from above, without a nut.

Figure 6:
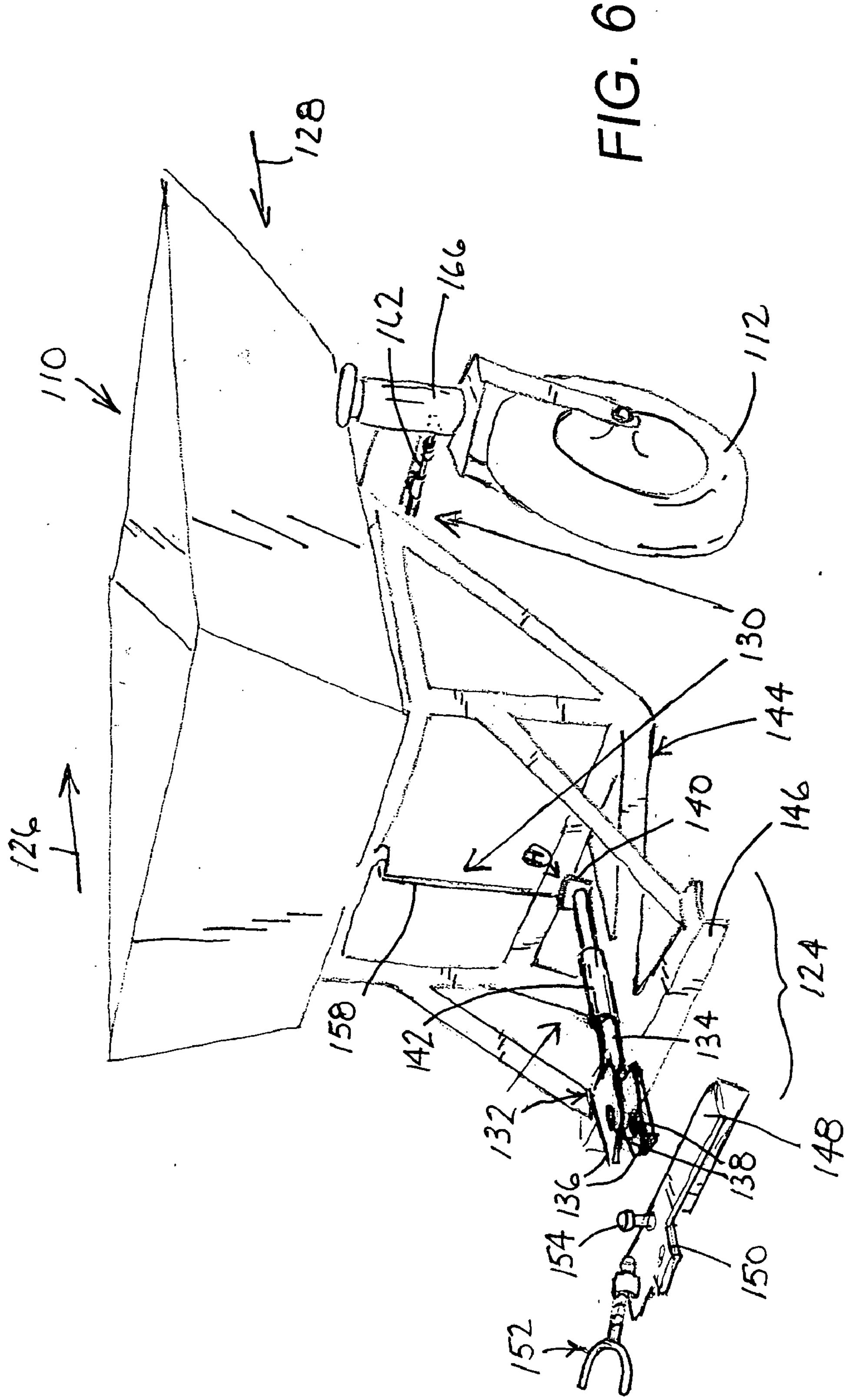
FIG. 6 is a schematic perspective view of another trailer hitch assembly in accordance with the present invention.
Figure 7:
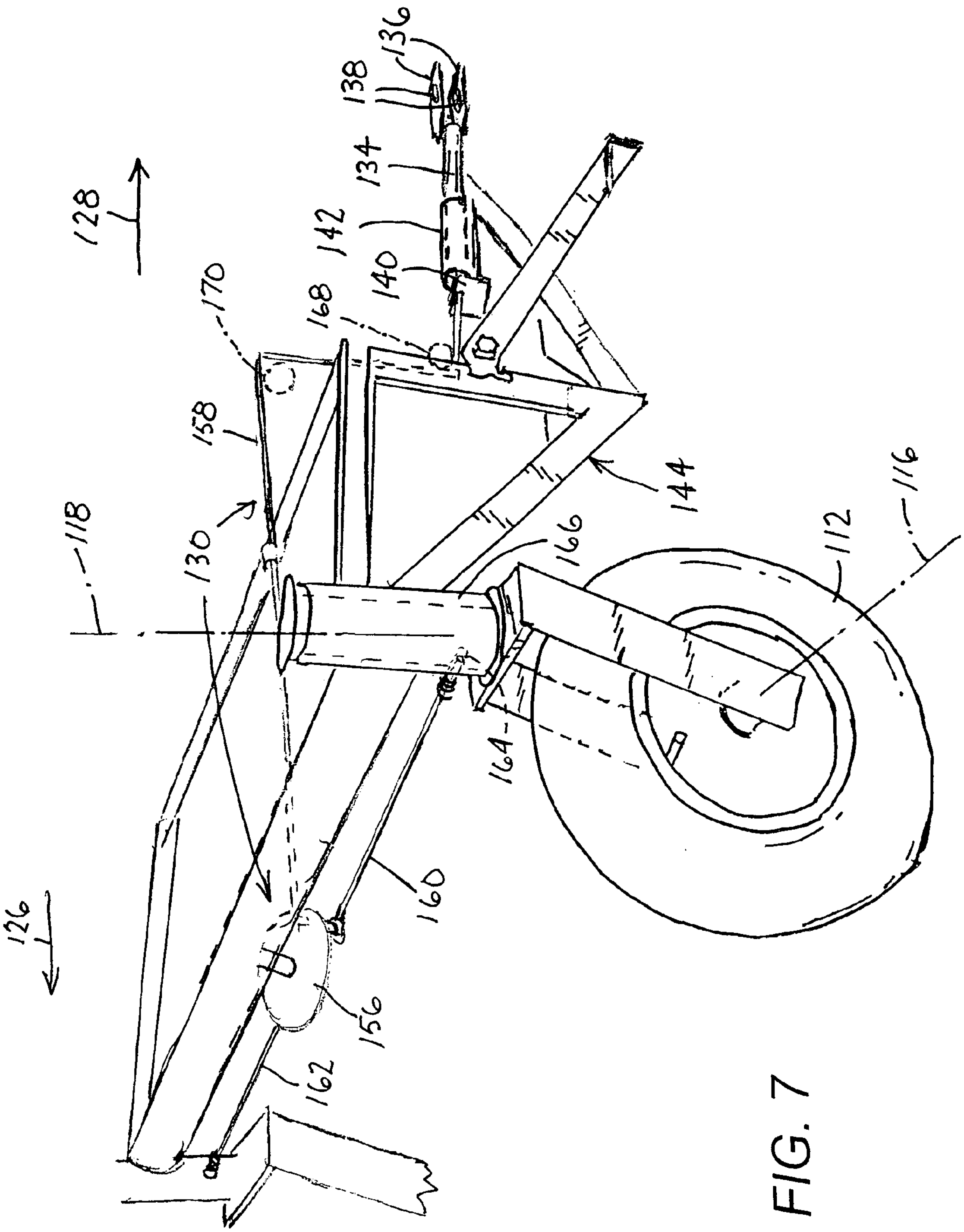
FIG. 7 is a schematic perspective view of a portion of a trailer including a castor-type wheel, shown in FIG. 6.

As illustrated in FIGS. 6 and 7, a trailer hitch assembly comprises a trailer 110 having a pair of castor-type wheels 112. Wheels 112 are rotatable about respective horizontal axes 116 oriented parallel to an underlying ground surface and respective vertical axes 118 oriented substantially perpendicularly to such ground surface. The hitch assembly further comprises a co-functioning group of coupling elements 124 on trailer 110 for fixedly engaging the trailer to a towing vehicle (not shown) in a horizontal plane parallel to the ground surface during a rearward motion of the vehicle and the trailer (arrow 126) and for pivotably linking the trailer to the vehicle in the horizontal plane during a forward motion of the vehicle and the trailer (arrow 128). A locking mechanism 130 is operatively connected to the coupling elements 124 for preventing rotation of wheels 112 about the respective vertical axes 118 during forward motion of trailer 110 and the towing vehicle and for enabling rotation of wheels 112 about axes 118 during rearward motion of the trailer and the vehicle.

The coupling elements 124 include a trailer hitch member 132 of variable effective length mounted to trailer 110 and connectable to the towing vehicle. Trailer hitch member 132 takes the form of a cylindrical bar or rod 134 provided at a forward end with a coupling tongue in the form of a pair of parallel plates 136 having bolt-receiving apertures 138. Bar or rod 134 is provided at a rearward end with a stop disk 140. Bar or rod 134 slidably traverses a cylindrical bearing 142 welded to a trusswork 144 on the forward side of trailer 110.

Coupling elements 124 additionally include a bar 146 attached to trusswork 144 so as to extend substantially perpendicularly to a longitudinal axis (not shown) of trailer 110 in a horizontal plane, i.e., substantially parallel to the ground surface. Bar 146 may take the form of an angle beam or a channel member.

Coupling elements 124 also include a second angle or channel bar 148 connectable to a rear side of a towing vehicle (not shown) at exactly two locations on the towing vehicle, by means of a trailer-post fastener 150 and a clamp 152. Clamp 152 has a structure and function identical to clamp 46 discussed hereinabove with reference to FIGS. 4 and 5. A connector 154 such as a pin or bolt is provided for connecting bar 146 and thus trailer 110 to bar 148 at exactly one location.

Bars 146 and 148 are engaged with one another during a rearward motion of the towing vehicle and trailer 110 and are spaced from one another during a forward motion of the vehicle and the trailer. Because trailer hitch member 132 is constrained to a single degree of freedom of motion, i.e., because trailer hitch member 132 can only translate in a single direction, generally but not necessarily substantially parallel to the longitudinal axis of trailer 110, bar 146 is constrained to remain in contact with and parallel to bar 148, thus forcing wheels 112 to pivot about vertical axes 118 when the towing vehicle turns during rearward travel.

Locking mechanism 130 includes a spring loaded disk 156 (FIG. 7) operatively connected to trailer hitch member 132, an elongate tensile member 158 extending from the spring loaded disk 156 to trailer hitch member 132, and a pair of locking rods 160 and 162 extending substant/lly perpendicularly to the longitudinal axis of trailer 110. Rods 160 and 162 are pivotably connected to disk 156 and to tensile member 158. Disk 156 is spring biased to pivot about a substantially vertical axis oriented perpendicularly to the ground surface.

Tensile member 158 is connected at a forward end to stop disk 140 of trailer hitch member 132 and at a rearward end to an edge of spring loaded disk 156. Tensile member 158 may include rigid portions, such as rods (not separately illustrated), or may be made entirely of a flexible material such as cable or cord. Pulleys 168, 170 may be provided for changing the angle of inclination of tensile member 158 at different points along its transit from stop disk 156 to spring loaded disk 156.

Upon a rearward motion of a towing vehicle, bringing bars 146 and 148 into contact with one another, trailer hitch member 132 slides so as to decrease tension on tensile member 158, allowing spring-loaded disk 156 to automatically rotate and pull rods 160 and 162 inwardly, out or engagement with holes or recesses 164 in vertical wheel tubes 166. Wheels 112 are thus free to pivot about vertical axes 118, in accordance with the direction of rearward motion of the towing vehicle.

Upon a subsequent forward motion of the towing vehicle, bars 146 and 148 separate from one another while trailer hitch member 132 slides forward, pulling tensile member 158 and consequently forcing a rotation of spring loaded disk 156 so as to allow rods 160 and 162 to shift outwardly, into potential engagement with holes or recesses 164 in vertical wheel tubes 166. Upon an engagement of stop disk 140 with a rear end of cylindrical bearing 142, trailer 110 is entrained into forward motion. Wheels 112 pivot about vertical axes 118 until rods 160 and 162 insert into holes or recesses 164, thereby locking the wheels against further rotation about axes 118. Trailer 110 follows the towing vehicle, pivoting with respect to the towing vehicle, the pivoting occurring about connector pin or bolt 154.

Although the invention has been described in terms of particular embodiments and applications, one of ordinary skill in the art, in light of this teaching, can generate additional embodiments and modifications without departing from the spirit of or exceeding the scope of the claimed invention. For example, the tensile member of the locking mechanism may extend at the leading or forward end from a point on the trailer hitch assembly closed to the vehicle, for instance, from the hitch bar on the vehicle. In any case, the tensile element is responsive to varying distance between the trailer and the towing vehicle to induce a locking of the trailer wheels during forward motion of the vehicle and the trailer. Accordingly, it is to be understood that the drawings and descriptions herein are proffered by way of example to facilitate comprehension of the invention and should not be construed to limit the scope thereof.

What is claimed is:

1. A trailer hitch assembly comprising:

a trailer having a plurality of swivel wheels, said trailer having a front side and a back side and a longitudinal axis oriented perpendicularly to said front side and said back side;

a first bar attached to said trailer at said front side, said bar extending substantially perpendicularly to said axis and substantially parallel to a ground surface;

a second bar;

coupling means for securing said second bar to a rear side of a towing vehicle at exactly two locations on said towing vehicle, said coupling means including a fastener for coupling said second bar to a trailer post on said vehicle, said coupling means further including a clamp connected to said second bar at a position spaced from said fastener for coupling said second bar to a bumper bar of said vehicle; and a connector for forming a quick-release connection of said first bar to said second bar at exactly one location so that said first bar and said second bar are in direct contact with one another along at least a portion of said bars respective lengths.

2. The trailer hitch assembly defined in claim 1 wherein said clamp includes a hook element passable around said bumper bar of said towing vehicle.

3. The trailer hitch assembly defined in claim 2 wherein said hook element is a U-shaped rod.

4. The trailer hitch assembly defined in claim 1 wherein said connector includes a pin.

5. The trailer hitch assembly defined in claim 1 wherein said clamp further includes a screw for adjusting a length of said clamp.

* * * * *